Aug. 14, 1945.  F. R. McFARLAND  2,382,246

MOTOR VEHICLE

Filed March 27, 1942  2 Sheets-Sheet 1

Inventor
Forest R. McFarland

By Sibbetts & Hart
Attorneys

Aug. 14, 1945.     F. R. McFARLAND     2,382,246
MOTOR VEHICLE
Filed March 27, 1942     2 Sheets-Sheet 2
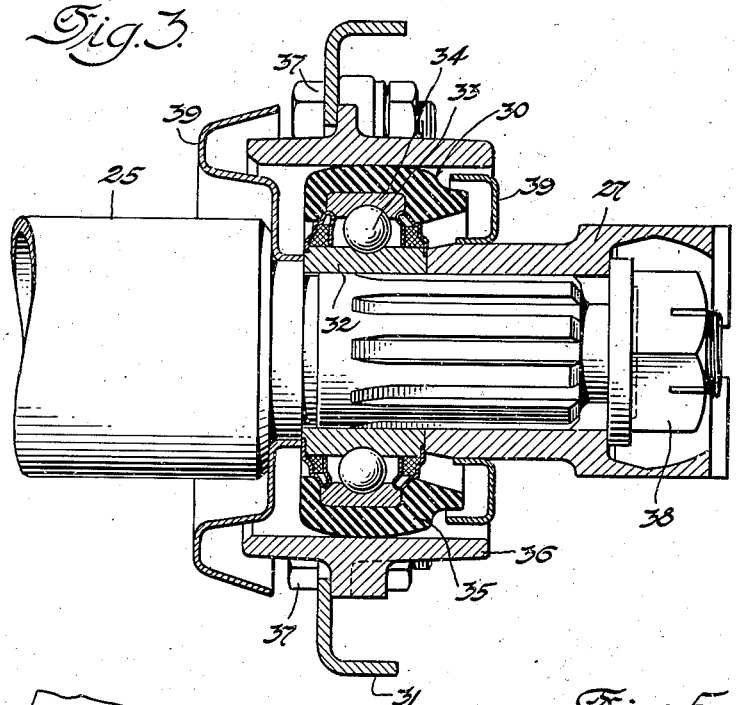
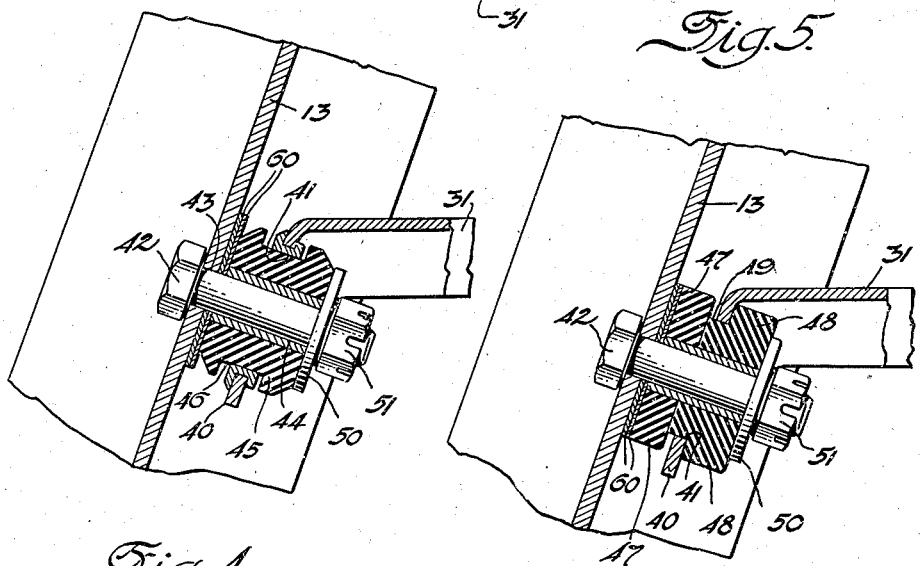
INVENTOR.
Forest R. McFarland Patented Aug. 14, 1945

2,382,246

UNITED STATES PATENT OFFICE 2,382,246

MOTOR VEHICLE

Forest R. McFarland, Huntington Woods, Mich., assignor to Packard Motor Car Company, Detroit, Mich., a corporation of Michigan Application March 27, 1942, Serial No. 436,479

8 Claims. (Cl. 180—70)

This invention relates to motor vehicles, and more particularly to the mounting of drive shafts.

The driving axle structure of motor vehicles includes a housing, carried by springs secured to the frame, and a drive pinion shaft mounted in and projecting from the housing. The change speed mechanism includes a housing mounted to rock on the frame but restrained from any substantial longitudinal movement. The change speed mechanism housing carries a tail shaft, and a drive or propeller shaft is connected to the tail shaft and the pinion shaft by universal joints.

The propeller shaft of an average wheel base vehicle is formed as a rigid structure but in the longer wheel base vehicles it is necessary to form the propeller shaft in two sections connected by a universal joint. The shaft section adjacent the tail shaft is carried by a bearing flexibly mounted on a supporting member extending transversely of the vehicle frame and flexibly connected therewith. These flexible mountings for the bearing and supporting member allow some movement of the bearing toward a proper alignment when there is run-out or unbalance of the supported shaft section, but this movement has been restricted by high compression of the flexible mountings with the result that shaft disturbance passes through the stiff, flexible mountings to the frame and body producing undesirable sound effects.

An object of this invention is to provide a mounting for supporting a sectional propeller shaft in proper alignment that is connected with the vehicle frame by a support having controlled flexibility within limits regardless of manufacturing variations in the frame structure.

Another object of the invention is to reduce vibration in a motor vehicle caused by unbalance of a jointed propeller shaft.

Another object of the invention is to provide a flexible connection between a vehicle frame and a propeller shaft bearing support that will reduce vibration resulting from unbalance of the shaft.

Other objects of the invention will appear from the following description taken in connection with the drawings, which form a part of this specification, in which:

Fig. 3 is a sectional view taken on line 3—3 of Fig. 1 showing the propeller shaft bearing and mounting;

Fig. 4 is a sectional view on line 4—4 of Fig. 2 showing one of the connections attaching the bearing supporting member to the vehicle frame;

Fig. 5 is a sectional view similar to Fig. 4 showing a modified form of the invention.

Figure 1:
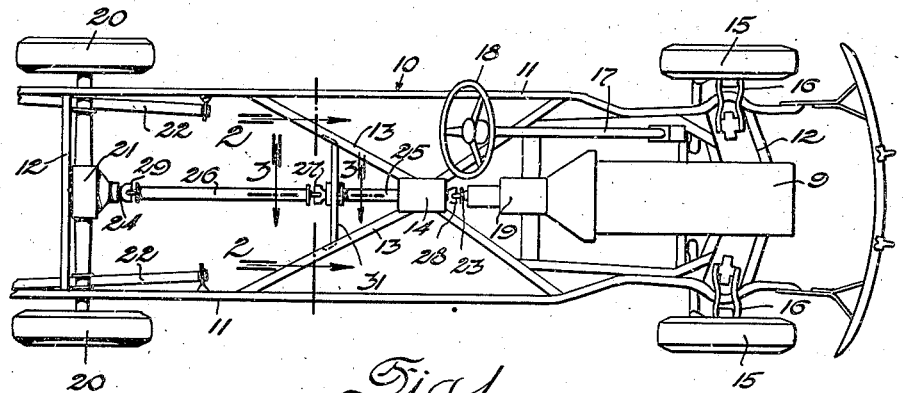
Fig. 1 is a plan view of a motor vehicle chassis having the invention incorporated therewith.
Figure 2:
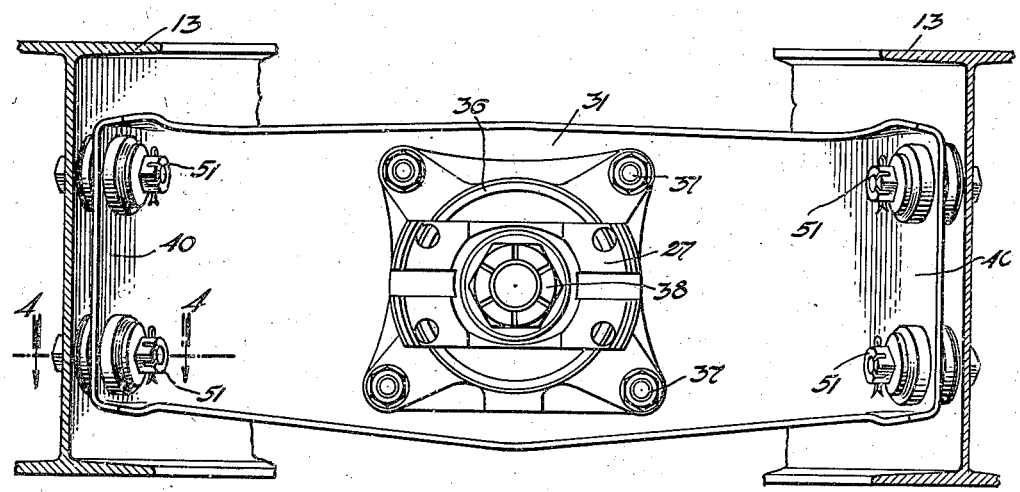
Fig. 2 is a sectional view taken on line 2—2 of Fig. 1 showing the bearing supporting member attached to the vehicle frame.

Referring now to the drawings by characters of reference, 10 indicates generally the chassis of a motor vehicle having a relatively long wheel base. The vehicle frame consists of longitudinally extending side members 11 connected by transversely extending end members 12 and an X brace structure consisting of members 13 secured together at their junction by a gusset structure 14. Front wheels 15 are connected to the frame by links 16 and are steered by mechanism extending through column 17 and connected to handwheel 18.

An engine 9 is mounted on the front end of the frame and change speed gearing of conventional design is carried in a housing 19 fixed to the rear end of the engine. The engine and gearing housing are mounted in a conventional manner to permit limited rocking transversely of the frame but substantially fixed in their position longitudinally of the frame. The rear wheels 20 are driven by conventional axle mechanism contained in housing 21 that is connected to springs 22 connected at their ends to the frame.

A tail shaft 23 is carried by and projects from the rear end of the change speed gearing housing and a pinion drive shaft 24 is mounted in and extends forwardly from the axle housing. Between the tail and pinion shafts extends a drive or propeller shaft consisting of two sections 25 and 26 connected by universal joint 27. Section 25 is connected with the tail shaft by universal joint 28 and section 26 is connected with the pinion shaft by universal joint 29.

The propeller shaft section 25 is mounted in a center bearing 30 supported on a carrier member 31 located preferably to the rear of gusset 14. The rear end of the shaft section 25 is reduced and splined to receive a portion of universal joint 27 and a bearing race 32 is mounted forwardly of such portion of the universal joint. Balls 33 are arranged between race 32 and an outer race 34, and the outer race is partially encased by a rubber bearing ring 35 mounted in a sleeve member 36 having arms fixed to the carrier member 31 by bolts 37. The periphery of the rubber ring is curved to reduce the surface subjected to compression force opposing angular movement of the propeller shaft section. A nut 38 is applied to the rear end of the propeller shaft section to retain the universal joint thereon and which will in turn position the bearing longitudinally on the shaft section. Suitable guard rings 39 are arranged at each end of the bearing.

The sides of the carrier member are each supported by members 13 of the frame on a pair of flexible mounting means of a character such as to control vibrational disturbances transmitted to the frame by unbalance of the supported propeller shaft section. The sides 40 of the carrier member are bent to extend parallel with adjacent frame members 13 and have openings 41 therethrough. Bolts 42 project through openings 41 and corresponding openings 43 in frame members 13. Insulators are mounted on the bolts and are formed of tubular rubber fixed on an interior sleeve 44. In Fig. 4 the insulator is formed of a single piece of rubber 45 having a central peripheral portion 46 of smaller diameter than the end portions, while in Fig. 5 the insulator is formed of two rubber rings 47 and 48 arranged end to end. The ring 48 has the end adjacent ring 47 reduced in diameter to form a recess 49. The smaller diameter portions of the insulators are substantially the same diameter as the openings 41 in the sides of the carrier member and have a sliding fit therewith when assembled with the frame and carrier member.

The insulators are clamped to the frame members 13 by washers 50 engaged by nuts 51 screwed on bolts 42. The adjustment of nuts 51 will regulate the compression of the insulators. The insulator 45 can be compressed between the frame and the washer while the insulator member 48 shown in Fig. 5 can be compressed between the washer and the adjacent carrier member side. In order to compensate for variations in the length of carrier members and the distance between frame members to which they are to be attached, resulting from manufacturing inaccuracies, washers or shims 60 can be inserted between frame members 13 and the insulators.

With both forms of the invention, the carrier member can shift transversely of the vehicle on the smaller diameter portions of the insulators. The axes of the insulators extend normal to the side portions of the carrier member so that the carrier member can shift transversely of the frame without interference other than by predetermined controlled flexing. With the form of the invention shown in Fig. 4 there can be a limited range of free movement and controlled flexible resistance, regulated by the compression of the insulator, to further movement of the carrier member beyond the free range of movement. With the form of the invention shown in Fig. 5, transverse movement of the carrier member will be free to a limited extent with respect to the insulators at one side but restrained by compression of rings 48 of the insulators at the other side, the compression of the rings at one side offering relatively low resistance to a small range of transverse movement of the carrier member. Referring further to Fig. 5, relatively high resistance will be offered to a larger range of transverse movement of the carrier member because insulator rings 48 at one side will be further compressed and insulator rings 47 at the other side will be compressed. The free movement occurs at one side in Fig. 5 and at both sides in Fig. 4 because the small diameter portions of the insulators are of greater length than the thickness of the sides of the carrier member.

This support will permit the shaft to be properly aligned and will absorb forces resulting from unbalance of the propeller shaft so that vibration in the vehicle frame and body will be materially reduced.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle, a frame having transversely spaced members, a sectional propeller shaft extending longitudinally of the frame, a carrier member extending transversely of the frame between the spaced members, a bearing for one of the sections of the propeller shaft, a flexible mounting for the bearing supported on the carrier member, and rubber insulators extending inwardly from and fixed to the frame members on which the sides of the carrier member are slidably mounted, said insulators allowing a limited unrestrained movement of the carrier member transversely of the frame and flexibly restricting such movement beyond the unrestrained movement of the carrier member.

2. In a vehicle, a frame having transversely spaced members, a sectional propeller shaft extending longitudinally of the frame, a carrier member extending transversely of the frame between the spaced members and having apertured side portions parallel to the adjacent frame members, a bearing for one of the sections of the propeller shaft flexibly mounted on the carrier member, rubber insulators projecting inwardly from the frame members having peripheral surfaces of greater length than the thickness of the carrier member extending through the apertures in the sides of the carrier member, the peripheral end portions of the insulators extending radially beyond the apertures in the sides of the carrier member, and means securing the insulators to the frame members under low compression.

3. In a vehicle, a frame having transversely spaced members, a sectional propeller shaft extending longitudinally of the frame, a metal carrier member extending transversely between the frame members and having an aperture through which one section of the propeller shaft extends, a bearing for said shaft section flexibly mounted on the carrier member, and rubber insulators fixed on the frame members for supporting the sides of said carrier member to allow the member a limited free movement transversely of the frame and an elastically controlled movement transversely of the frame beyond the limits of the free movement.

4. In a vehicle, a frame having transversely spaced members, a centrally apertured carrier member extending transversely between the frame members, a sectional propeller shaft extending longitudinally of the frame and through the aperture in the carrier member, insulators fixed to the frame members, the sides of said carrier being mounted on said insulators and freely movable a limited extent relative thereto in a direction transversely of the frame, said insulators elastically restricting movement of the carrier member beyond the unrestricted range of movement, a bearing for one section of the propeller shaft, a sleeve surrounding the bearing and fixed to the carrier member, and a rubber ring supporting the bearing in the sleeve, said ring having a curved periphery engaging the interior of the sleeve.

5. In a vehicle having a frame with transversely spaced members, a carrier member extending transversely between the frame members having apertured side portions parallel with the frame members, a sectional propeller shaft, a bearing for one of the shaft sections mounted on the carrier member, a plurality of supporting means for the carrier member each comprising a pair of insulator ring members fixed to the frame members in endwise relation and under low compression, the end of one of said ring members abutting the other ring member having a reduced periphery piloted in an aperture in a carrier member side portion, the axial length of said reduced periphery being greater than the thickness of the carrier member adjacent thereto.

6. In a vehicle, a frame, a sectional propeller shaft extending longitudinally of the frame, a pair of rubber support means fixed to the frame, a transversely extending carrier member mounted on the rubber support means, and a bearing on the carrier in which one section of the shaft is mounted, said rubber support means having portions on which the carrier is freely movable transversely of the frame and other portions opposing transverse movements of the carrier resulting from vibrational forces developed by the shaft beyond a predetermined magnitude.

7. In a vehicle, a frame having side portions, a propeller shaft between the frame side portions, a carrier for the propeller shaft extending transversely of the frame and having apertured end walls, rubber insulators secured to and extending inwardly from the frame side portions, said insulators each having innermost and outermost portions of larger diameter and an intermediate portion of reduced diameter substantially the same as the diameter of the apertures in the carrier end walls and projecting therethrough, said carrier end walls normally contacting the innermost larger diameter portions of the insulators and spaced from the outermost larger diameter portions of the insulators.

8. In a vehicle, a frame, a sectional propeller shaft, a carrier member, rubber members mounted on the frame supporting the carrier member for limited transverse shifting movement, and a bearing for one of the shaft members flexibly mounted on the carrier member, said rubber members exerting relatively low resistance to a smaller range and relatively high resistance to a higher range of transverse shifting of the carrier member resulting from forces developed by unbalance of the shaft.

FOREST R. McFARLAND.